US007298896B2

(12) United States Patent
Yamaguchi et al.

(10) Patent No.: US 7,298,896 B2
(45) Date of Patent: Nov. 20, 2007

(54) IMAGE PROCESSING DEVICE FOR OPTICALLY DECODING AN IMAGE RECORDED ON A MEDIUM FOR DIGITAL TRANSMISSION OF THE IMAGE INFORMATION

(75) Inventors: Nobuyasu Yamaguchi, Machida (JP); Hirotaka Chiba, Atsugi (JP); Tsugio Noda, Hadano (JP)

(73) Assignee: Fujitsu Limited, Kawasaki (JP)

( * ) Notice: Subject to any disclaimer, the term of this patent is extended or adjusted under 35 U.S.C. 154(b) by 203 days.

(21) Appl. No.: 09/796,743

(22) Filed: Mar. 2, 2001

(65) Prior Publication Data

US 2001/0036314 A1    Nov. 1, 2001

(30) Foreign Application Priority Data

Mar. 3, 2000    (JP)    ............................. 2000-059341

(51) Int. Cl.
*G06K 9/00* (2006.01)
*G06K 9/38* (2006.01)

(52) U.S. Cl. ...................................... 382/172; 382/273
(58) Field of Classification Search ................ 382/168, 382/170, 172, 270, 271, 273; 358/465
See application file for complete search history.

(56) References Cited

U.S. PATENT DOCUMENTS

| 5,179,599 | A | * | 1/1993 | Formanek | 382/172 |
| 5,280,367 | A | * | 1/1994 | Zuniga | 358/462 |
| 5,617,484 | A | * | 4/1997 | Wada et al. | 382/172 |
| 5,751,848 | A | * | 5/1998 | Farrell | 382/172 |
| 5,784,500 | A | * | 7/1998 | Homma et al. | 382/270 |
| 5,848,182 | A | * | 12/1998 | Kanamori | 382/171 |
| 5,889,885 | A | * | 3/1999 | Moed et al. | 382/172 |
| 6,028,958 | A | * | 2/2000 | Kanamori | 382/171 |
| 6,363,381 | B1 | * | 3/2002 | Lee et al. | 707/6 |

* cited by examiner

*Primary Examiner*—Colin LaRose
(74) *Attorney, Agent, or Firm*—Kratz, Quintos & Hanson, LLP

(57) ABSTRACT

An image processing device such as an image scanner, etc., and its objective is to actualize a proper binarizing routine specific to the types of images. A histogram of density values is drawn based on decoded data, and after the respective levels and frequencies of the white and black peak values have been calculated, the types of decoded images are classified based on their relationships. After the original type has been thus determined, a binarization threshold value calculation method optimally suited for said type is selected, and after the threshold value has been thereby calculated, an image binarizing routine is executed.

2 Claims, 15 Drawing Sheets

Fig.6
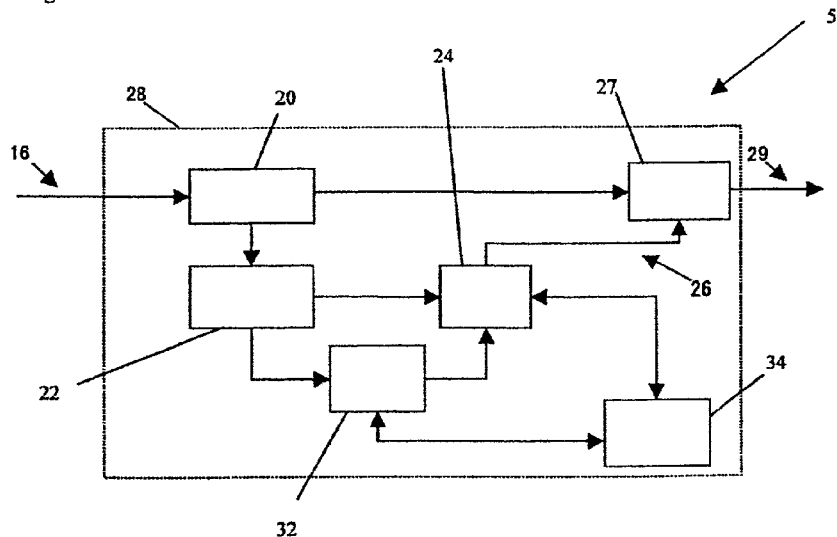
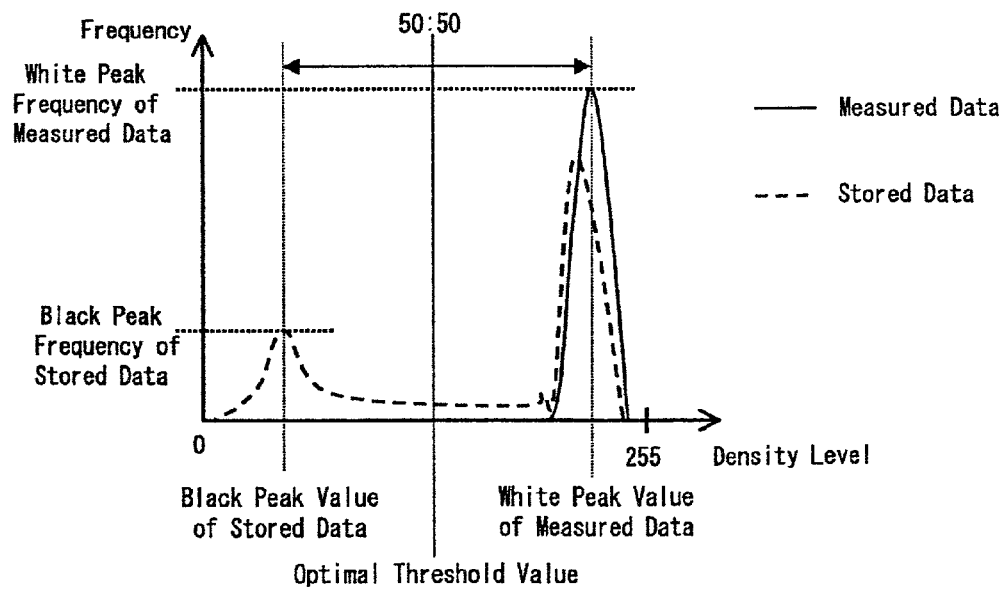
Fig.7

IMAGE PROCESSING DEVICE FOR OPTICALLY DECODING AN IMAGE RECORDED ON A MEDIUM FOR DIGITAL TRANSMISSION OF THE IMAGE INFORMATION

BACKGROUND OF THE INVENTION

1. Field of the Invention

The present invention relates to an image processing device such as an image scanner, facsimile, etc. More specifically, it relates to an image processing device that optically decodes an image which has been recorded on a medium and then converts it into an electrical signal to enable the display and transmission of digitalized information.

2. Description of the Related Art

As far as image processing devices of the prior art are concerned, routines for binarizing recorded multivalent image data by comparing it with threshold levels is being widely practiced, and various techniques are known for executing such binarizing routines.

FIG. 13 is a diagram which shows the constitution of an image processing device 5 of the prior art. The image decoding unit 14 includes a sensor unit 10. An analog signal 12 produced by said sensor unit 10 in accordance with the original decoding action of the image decoding unit 14 is converted into a digital signal 16 in an analog-digital conversion unit (A/D conversion unit) 18. The digital signal 16 which has been outputted by said A/D conversion unit 18 (one decoded line equivalent) is temporarily retained in a line data retention unit 20.

The digital signal 16 which has been produced by the A/D conversion unit 18 is further transferred to a density histogram generation unit 22 in the image processing unit 28. The density histogram generation unit 22 generates a histogram of the densities of the respective image pixels decoded.

FIGS. 14(a) and 14(b) are diagrams explaining the action of the density histogram generation unit 22. Raw image data which have been decoded by the sensor unit 10 are shown in FIG. 14(a). The image data shown in FIG. 14(b), which have been decoded, are transferred to the density histogram generation unit 22, from which a density histogram characterized by the distribution shown in FIG. 14(b) is generated.

As far as the device of the prior art is concerned, a threshold level for binarizing an image is generated by using this density histogram. The density histogram information is transferred to a threshold value generation unit 24, from which a threshold value 26 is generated, as shown in FIG. 13. The following calculation is involved in one example: Threshold value=0.5×(white peak value−black peak value)+black peak value. It may be assumed that "black peak value" signifies the peak density value of character segments, whereas the "white peak density" signifies the peak density value of the white background of the original. As far as the aforementioned example of the prior art is concerned, an intermediate level of the high-density peak level and the low-density peak level (i.e., ½) is designated as a "standard binarization" threshold value 26. This binarization threshold value 26 is input to a binarization unit 27 to produce binarized image data 29.

FIG. 15 is a diagram that shows another prior art example of an image processing device 5 for generating a threshold value 26. A digital signal 16, which has been outputted from an A/D conversion unit 18, is inputted into a shading calibration unit 30. Subsequently, a threshold level is generated according to procedures similar to those for the device of FIG. 13.

In the example of FIG. 15, however, the binarization threshold value 26 is designated while the low-density/high-density peak frequency is being taken into account. FIGS. 16(a) and 16(b) are diagrams explaining the action of the density histogram generation unit 22 of FIG. 15. the following values are specifically calculated: Minimal-to-maximal density ratio=maximal density peak frequency/(maximal density peak frequency+minimal density peak frequency); threshold value=minimal-to-maximal density ratio×(maximal density peak value−minimal density peak value)+minimal density peak value.

The example shown in FIGS. 13, 14(a) and 14(b) suffers from a disadvantage in that when the frequency rations of black and white segments radically differ (e.g., two-dimensional code), the two-dimensional code information may become excessively dense or thin even if the threshold value 26 is designated at the ½ level of the respective peak values, as a result of which it becomes impossible to binarize and reproduce the white and black dimensions of the original in high fidelity.

The example shown in FIGS. 15, 16(a) and 16(b), on the other hand, is capable of alleviating the problem of the example shown in FIGS. 13, 14(a) and 14(b) to some extent, but depending on the types of originals, it may become impossible to reproduce and express the frequency ratios of the black and white segments of the original in high fidelity, as a result of which it becomes impossible to execute a binarizing routine whereby the information specific to the original is reproduced in high fidelity.

SUMMARY OF THE INVENTION

The objective of the present invention, which has been conceived in response to the aforementioned problems, is to provide an image processing device which enables a stable original binarizing routine.

The present invention concerns an image processing device that possesses a histogram generation mechanism which generates a density histogram that shows a density value distribution based on image data obtained from an image decoding unit which serves a function of decoding images recorded on a medium, a mechanism which calculates not only low-density-side peak levels and high-density-side peak levels but also the low-density peak frequency and the high-density peak frequency based on the density histogram generated above, an image type classification mechanism which determines the type of the decoded image based on the comparison results on the low-density peak frequency and the high-density peak frequency calculated above, and a threshold level generation mechanism which generates a threshold level for quantizing said image data based on said density histogram by means of a method specific to the type of the image determined above.

A threshold level specific to an image to be decoded can be designated by using such an image processing device, based on which a more accurate binarizing routine can be executed.

In particular, peak levels and peak frequencies which have been obtained during previous image decoding operations are stored, and a threshold level is generated by using the stored sets of information on low-density and high-density peaks.

Peak levels and peak frequencies obtained in previous image decoding operations are stored, and after the original type has been determined by comparing the current peak information with the stored peak information, a threshold level is generated based on the stored sets of information on the low-density peak or high-density peak.

The present invention also provides an image processing device which divides the binarized data obtained as a result of binarization into multiple regions, calculates the ratio between the number of high-density pixels and the number of low-density pixels with regard to each of the divided regions, and determines the type of the binarized image data within each region based on the high-density/low-density pixel number ratio.

In particular, such divided regions are obtained based on the pixel density distribution along the row direction which has been obtained from one-line-equivalent image data and the low-density/high-density pixel number ratio of each row, based on which the types of the respective divided regions are classified.

BRIEF DESCRIPTION OF THE DRAWINGS

FIG. 6 is a block diagram which shows the image processing device of another embodiment of the present invention.

FIG. 7 is a diagram provided for explaining the procedures for determining the optimal threshold value based on stored measurement data.

DETAILED DESCRIPTION OF THE PREFERRED EMBODIMENTS

Figure 1:
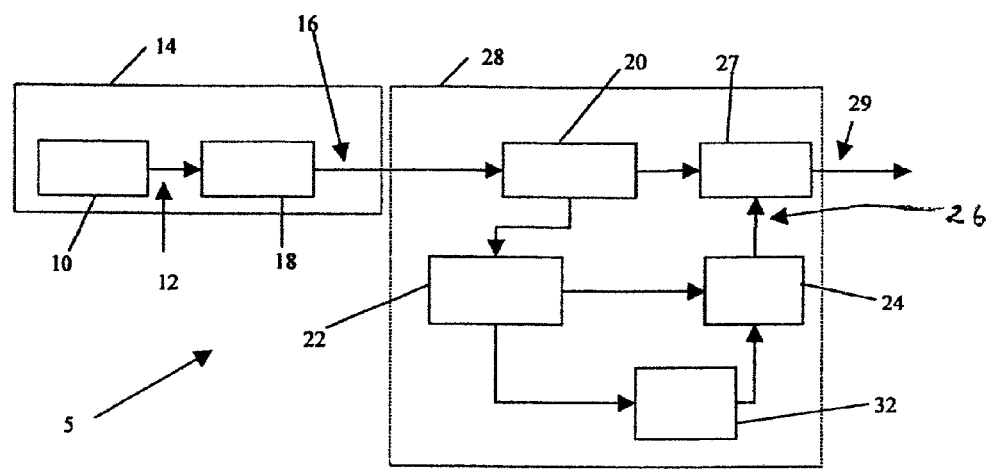
FIG. 1 is a block diagram which shows the image processing device of the first embodiment of the present invention.
Figure 13:
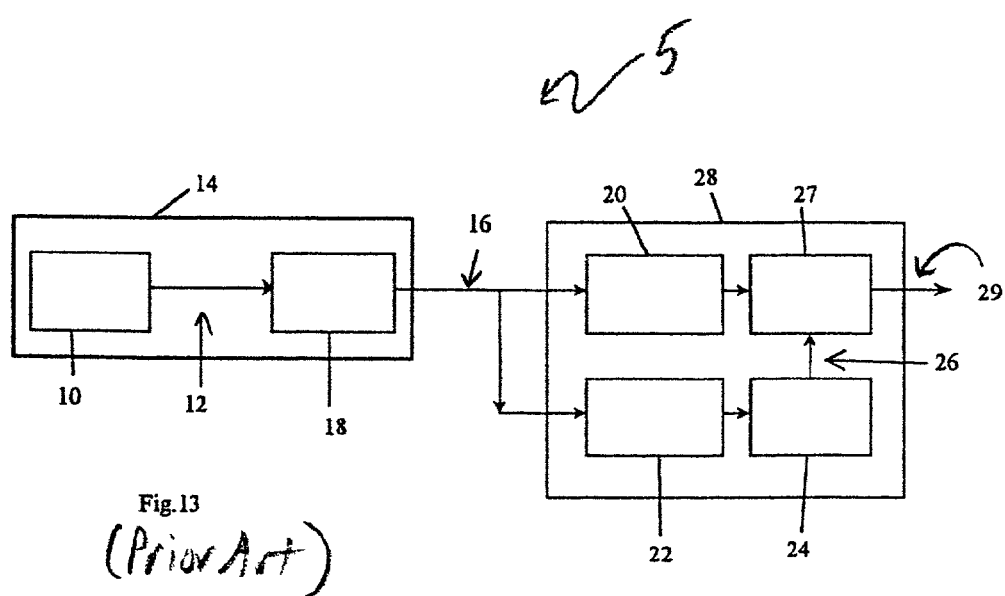
FIG. 13 is a diagram provided for explaining an image processing device of the prior art.
Figure 14A:
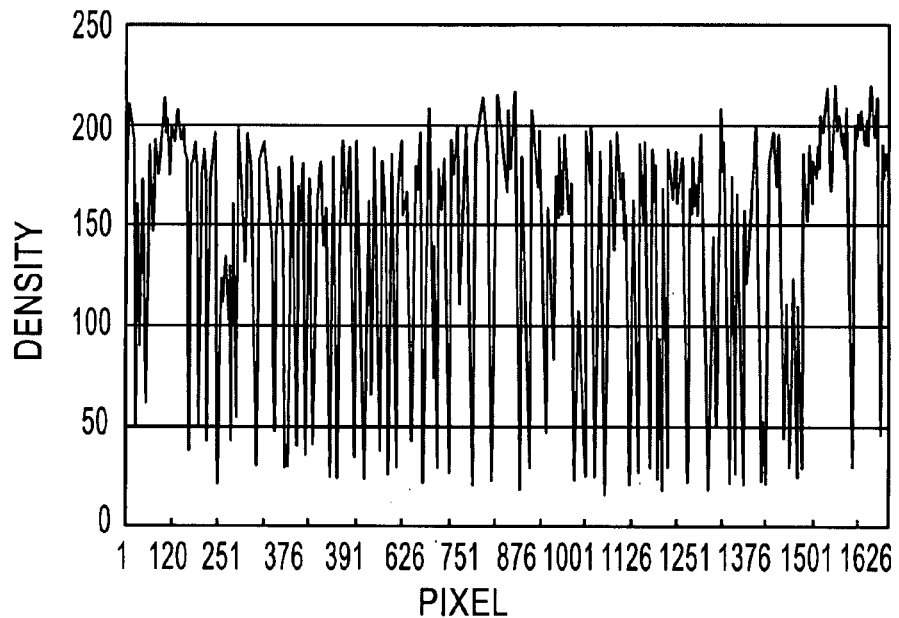
FIGS. 14(a) and 14(b) are diagrams provided for explaining threshold value determination and binarization routines of the image processing device of the prior art shown in FIG. 13.
Figure 14B:
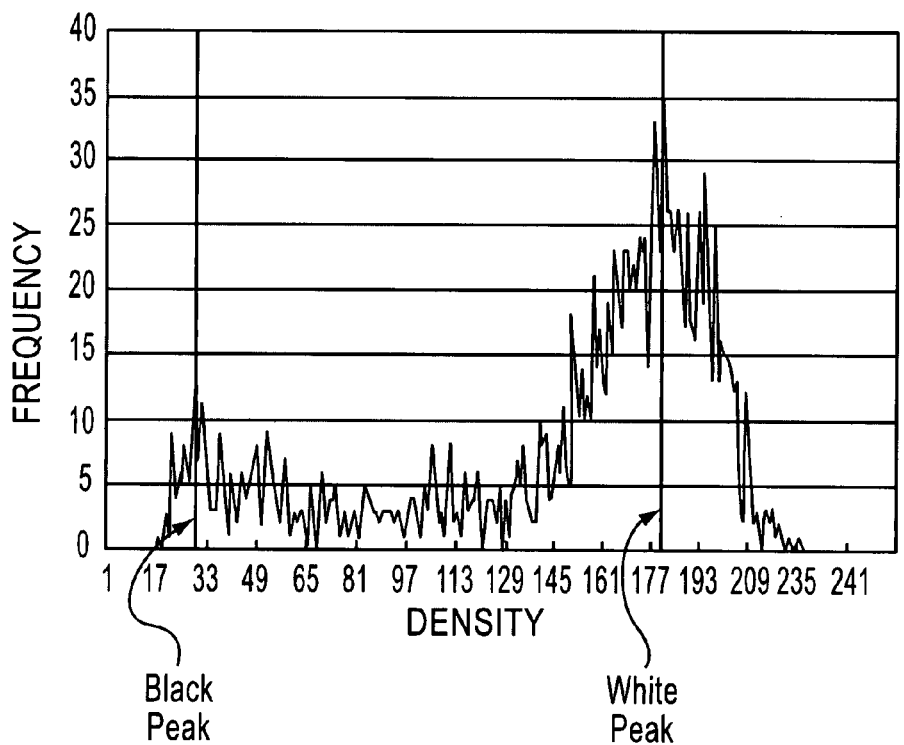
Figure 15:
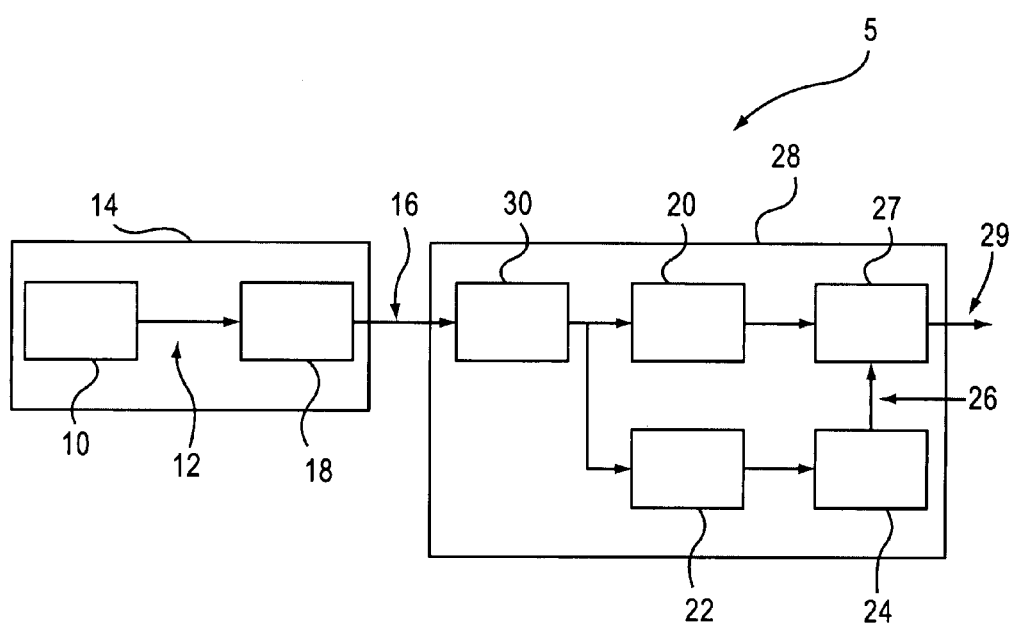
FIG. 15 is a diagram provided for explaining another image processing device of the prior art.
Figure 16A:
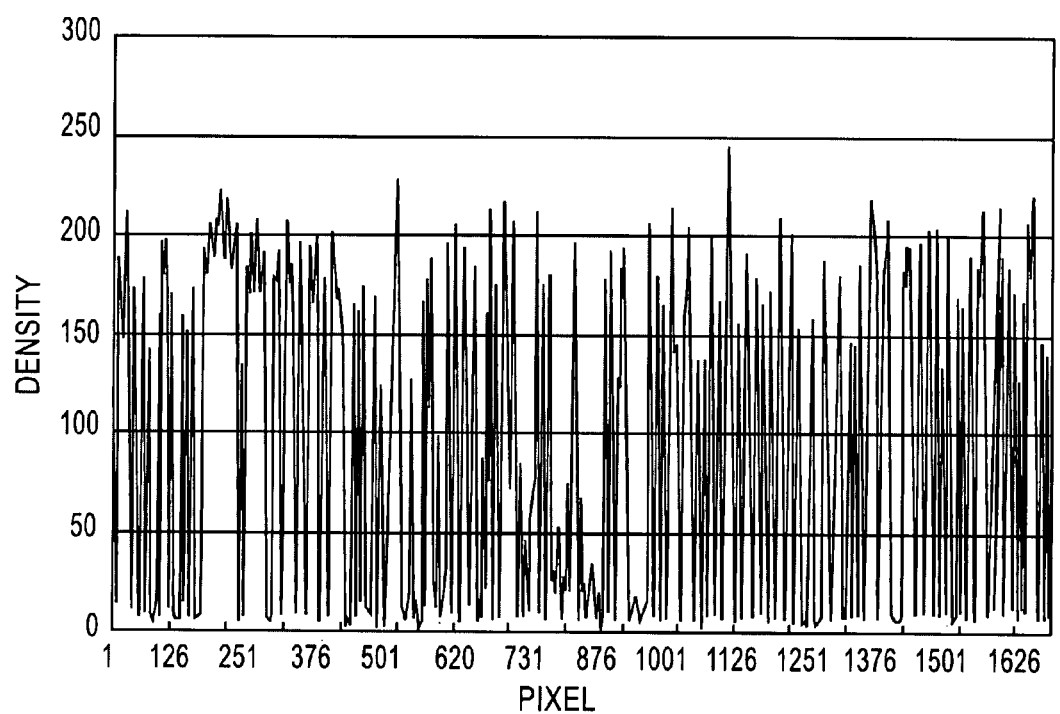
FIGS. 16(a) and 16(b) are diagrams provided for explaining threshold value determination and binarization routines in the image processing device of the prior art shown in FIG. 15.
Figure 16B:
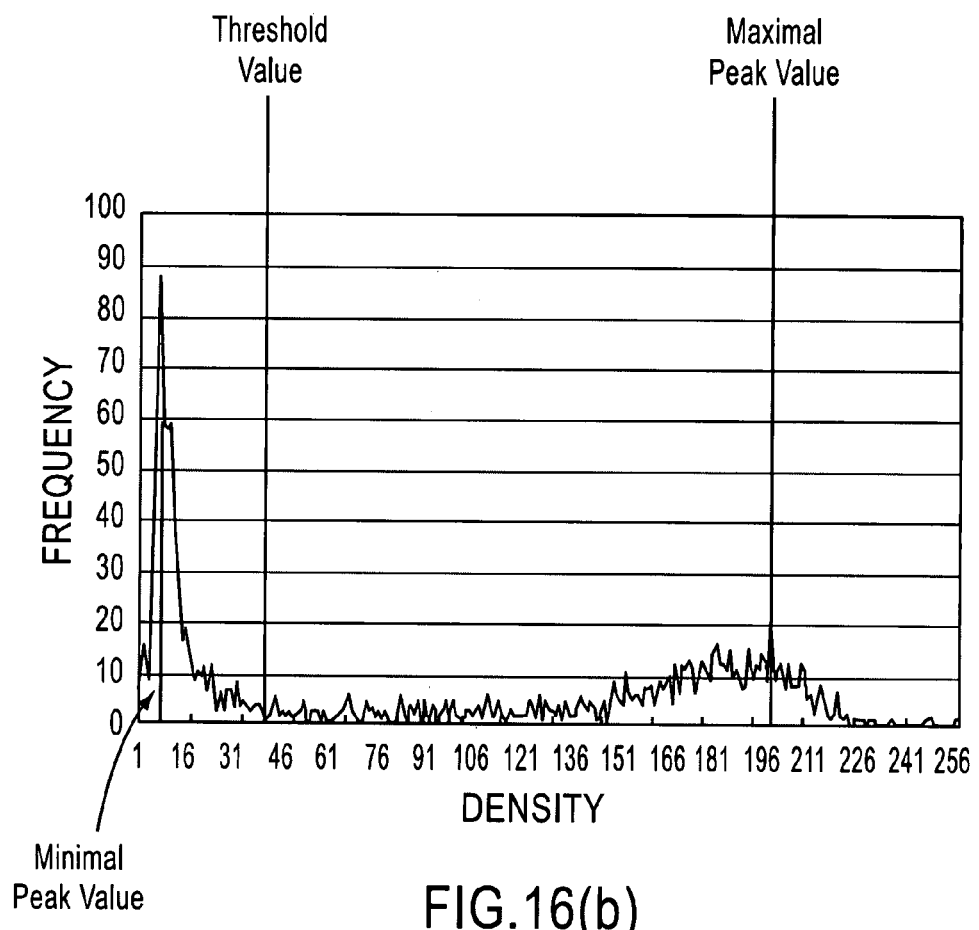

FIG. 1 is a block diagram explaining of the image processing device 5 of one embodiment of the present invention. The image processing device 5 of this embodiment adds an image type classification unit 32 to the image processing device of the prior art shown in FIG. 13. All other elements in FIG. 1 are the same as in FIG. 13.

The densities of inputted image data in this embodiment are distributed not only in the vicinity of the background density of a paper (maximal density) and the density of a character segment (minimal density) but also within an intermediate zone. Generally speaking, when a bichrome-printed text original is decoded, character segments exist at a certain ratio in relation to their background, and when its density distribution histogram is analyzed, two peaks can be ascertained to exist in the vicinity of the background density and in the vicinity of the character density. In the case of a text original, the area ratio of the characters (ink) with respect to their background is low, and therefore, the peak density of the background becomes greater than the character peak density. The density distribution is further moderated in the border between the character and background due to the effects of the optical properties of the decoding device and the background density. For this reason, a certain specifiable distribution is observed between the respective peak density levels of the density histogram distribution.

This attribute differs peculiarly depending on the types of originals, namely on the area ratio between background and character segments, character line thickness, etc. For this reason, it is necessary to determine the optimal threshold level while the specific characteristics of the density histogram distribution are taken into account for the purpose of reproducing original character thicknesses in high fidelity during a binarizing routine. The magnitude of the density peak corresponds fundamentally to the area ratio between the background and character segments of the original, but it is also affected greatly by the character line thickness, certain non-character designs or data formats (e.g., various codes, etc.). The peak density level itself, furthermore, may deviate from the default ink density depending on these characteristics of the original, and therefore, it is necessary to establish a threshold level determination method that optimally suits these density distribution attributes which reflect the characteristics of the original.

Put another way, it is also possible to classify the characteristics of an original, namely the types of text and data formats printed on the original, from such density histogram characteristics as the density peak magnitude and density level differential.

An optimal binarization threshold value determination method furthermore differs depending on the density distribution characteristics of character edge segments. For this reason, an optimal binarization threshold value specific to the original type classified depending on the ratio between the minimal density and maximal density histogram distribution may be preliminarily selected in preparation for a binarizing routine. In such a case, an accurate binarization which reflects the character thickness specific to the original characteristic in high fidelity can be executed.

The aforementioned image type classification unit 32 determines the type of an inputted image based on the density histogram thus inputted. The information on the specific type of the inputted image thereby determined is transferred to a threshold value generation unit 24. The threshold value generation unit 24 selects the threshold value determination method most suited for the image type based on the information obtained from the image type classification unit 32, which reveals the image types.

Figure 2:
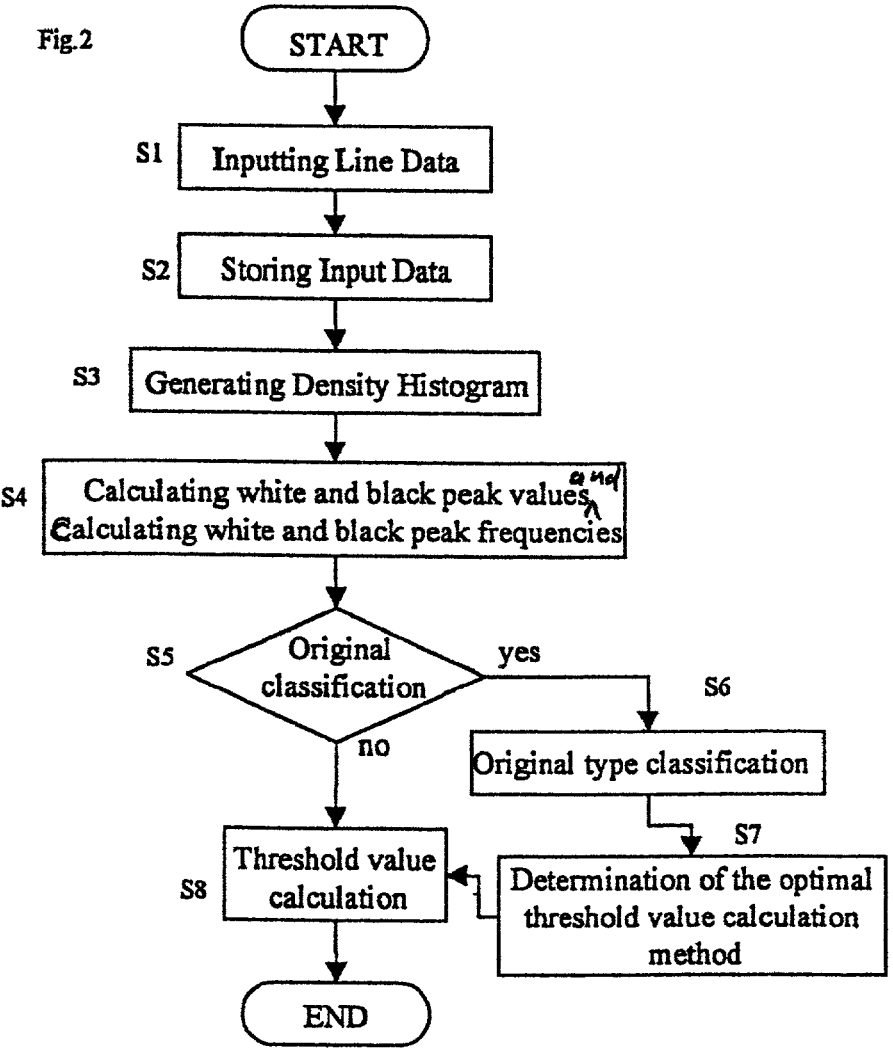
FIG. 2 is a flow chart which shows the binarized threshold value calculation procedures in the first embodiment.

FIG. 2 is a flow chart for explaining the binarization threshold value calculation procedures by using the image processing device shown in FIG. 1.

Once the input image has been initialized, one-line-equivalent line data are first decoded at step S1. The one-line-equivalent line data thus inputted are temporarily stored in the line data retention unit 20 at step S2. A density histogram corresponding to the line is subsequently generated by the density histogram unit 22 based on the pixel-specific density values of the inputted line data at step S3.

Next, the density histogram generation unit 22 calculates not only the white and black peak levels within the line data but also the respective frequencies of the white and black peaks at step S4.

The image type classification unit 32 subsequently determines the type of the decoding object original based on the white and black peak levels and white and black peak frequencies which have been calculated by the density histogram generation unit at steps S5 and S6. After the original classification results have subsequently been transferred to the threshold value generation unit 24, the threshold value calculation method optimal for the image is determined at step S7, followed by the calculation of the threshold value at step S8.

Incidentally, when the line data re entirely black or entirely white, it becomes impossible to calculate either the white peak value or the black peak value. In such a case, the peak value on the incalculable side is assumed to correspond to a preliminarily prepared maximal density value (255) or minimal density value (0) without classifying the original type in subsequent processing steps.

Figure 3:
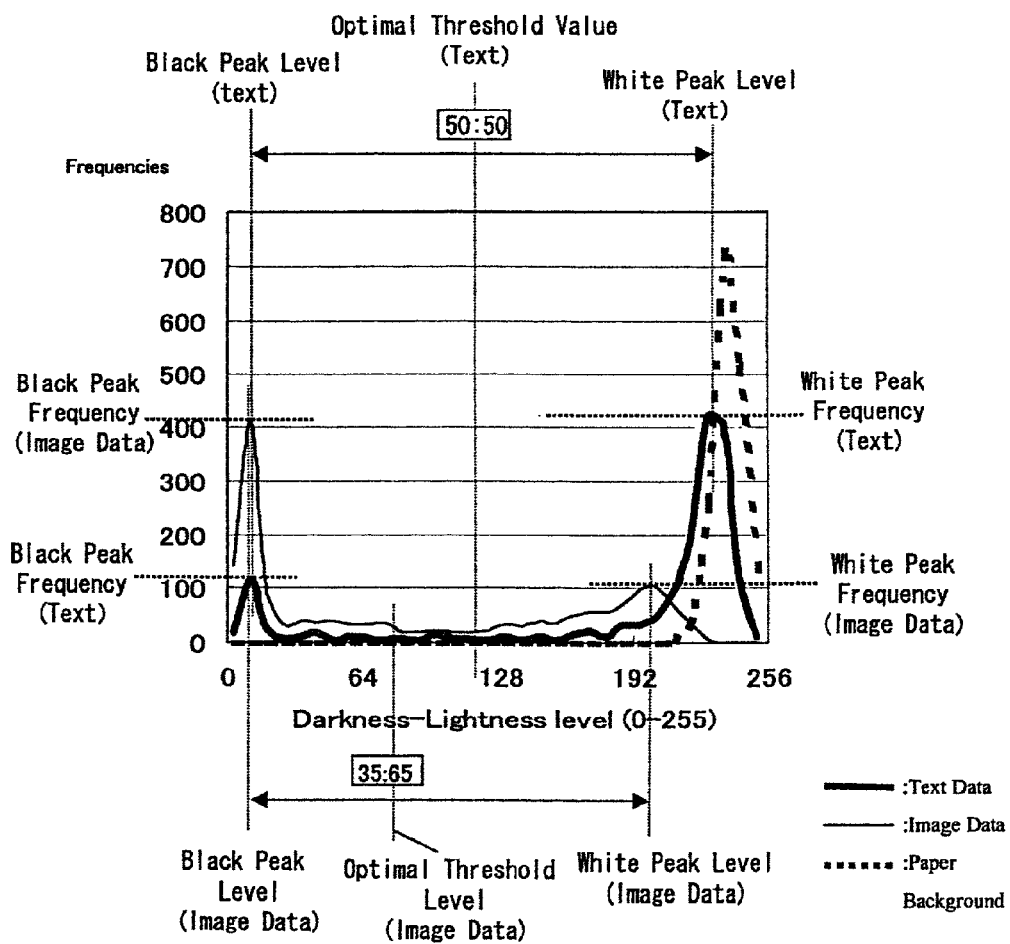
FIG. 3 is a diagram which shows a density histogram and threshold value determination procedures.

FIG. 3 is a diagram provided for explaining one method for determining the original type and for determining the optimal threshold value.

Two types of originals to be decoded, namely an ordinary text original and an original, the black-to-white density ratio of which is approximately 50:50, are hereby assumed. Incidentally, the background color and ink color are identical for the two types of originals.

When the ordinary text is decoded, the ration of the character black region with respect to the background white region is low, and therefore, when the white and black peak frequencies are compared, a relationship of "white-peak frequency>black peak frequency" can be ascertained. Due to the effects of the black region and the optical properties of the decoding device, furthermore, a relationship of "white peak frequency<black peak frequency" can be ascertained with regard to the image data decoded from the original with a black-to-white density ratio of approximately 50:50.

In the case of the original on which image data with a black-to-white density ratio of 50:50 have been recorded, the white peak level tends to deviate or shift toward the black density side form the otherwise expected white density (background color of the original). As a result, a relationship of "text white peak level>image white peak level" can be ascertained with regard to the density histogram distribution.

It can be determined based on the hierarchical relationship between the white and black peak frequencies whether the region in which the input data are measured corresponds to a text region or image region by virtue of these characteristics.

As FIG. 3 graphically illustrates, the black peak levels of the cases of the text and image data should be virtually identical if an identical ink is being used. The black peak value frequency, however, differs depending on the types of originals on which it is recorded, and accordingly, the black peak value frequency of the image data is higher than the black peak value frequency of the text original. When the respective white level peaks of the text and image data are compared, the white peak value of the image data is shifted toward the black side in comparison with the white peak value of the text. An example of a case where the background of the paper alone has been decoded is also shown in FIG. 3 for comparative purposes. Thus, when the background of the paper alone is decoded, the white peak value further shifts toward the right side of the figure in comparison with a case where a text is decoded.

When an image to be decoded is a text, the intermediate value of detected black and white peak values, namely a value that yields a 50:50 ratio, is designated as the optimal binarization threshold level, for it has been known that a level that splits the spectrum between the white and black levels at a ratio of 50:50 serves as the optimal threshold level in relation to ordinary texts. When an image to be decoded pertains to non-character image data, on the other hand, a level that splits the spectrum between the black-and white peak values at a ratio of 35:65 is designated as the optimal threshold level with regard to the example of FIG. 3. The ratios for determining the image data threshold values have been determined experimentally, and the ratios may differ from the aforementioned ones depending on the types of images or conditions.

Figure 4:
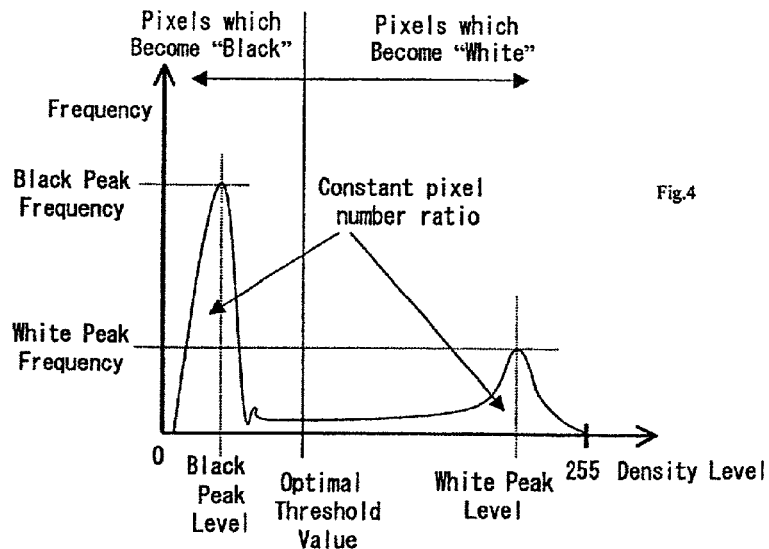
FIG. 4 is a diagram which shows another density histogram and threshold value determination procedures.

FIG. 4 is a diagram provided for explaining another method for determining the threshold value, and a threshold value determination method on image data which yields a white-to-black ratio of 50:50 is hereby explained, as in FIG. 3.

As has been mentioned above, when an original whose white-to-black ratio has preliminarily been known to be 50:50 is decoded, a binarization result, which more accurately reflects the characteristics of the original, can be expected by designating the threshold value at a level which yields a binarized image with a white-to-black pixel ratio of 50:50. In the example of FIG. 4, therefore, the number of pixels (=frequency) at the respective densities of the density histogram are calculated, and a level which yields a constant ratio between the number of pixels on the black side and the number of pixels on the white side (identical numbers of pixels in accordance with the characteristics of the original in FIG. 4) is designated as the threshold level. In such a case, binarization results which accurately reflect the characteristics of the original can be obtained by designating the ratio between the number of pixels which become black after binarization and the number of pixels which likewise become white at 50:50 or its vicinity.

Figure 5:
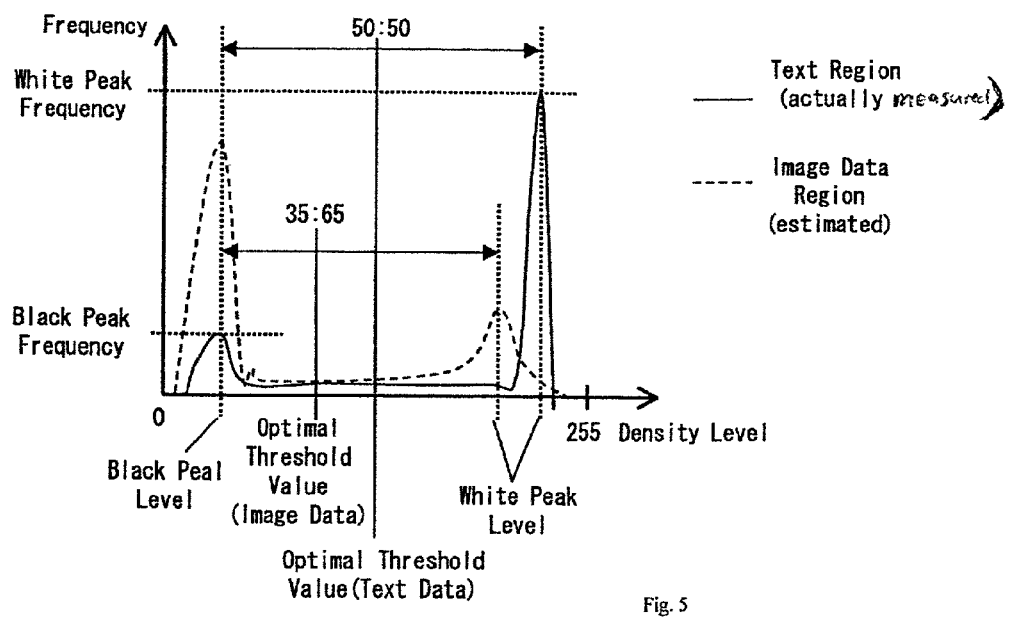
FIG. 5 is a diagram provided for explaining a method for estimating the threshold value based on actual measurement data.

FIG. 5 is a diagram provided for explaining a method for determining optimal threshold levels with regard to other assessable types of originals apart from the optimal threshold levels specific to the types of originals as they are calculated from the density histogram distribution.

It is not uncommon for a single page of an original to be decoded to be characterized by the coexistence of an ordinary text which has been printed by using an identical ink and image data characterized by a white-to-black pixel ratio of 50:50, as in the aforementioned case. When an attempt is made to decode such an original for the purpose of effectively utilizing the image data segment, however, it becomes necessary to designate a threshold level specific to the image data. When density histogram data are obtained in a region of said original in which an ordinary text has been printed, however, the image input device determines that the decoded image is constituted by an ordinary text in that the relationship of "white peak frequency>black peak frequency" holds with regard to the density histogram, and accordingly, the level that splits the spectrum between the white and black peak levels at a 50:50 ratio is finalized as the optimal threshold level. When a decoding action is directly invoked in such a state, it becomes impossible to perform a binarization routine optimally suited for the recorded original within the image data region, which has been initially targeted for effective utilization.

It is hereby assumed to be preliminarily known that ordinary text and image data are characterized by the density histogram distribution shown in FIG. 3. In other words, when it is known that the white peak level of the image data is consistently lower than the white peak level of the ordinary text by a specifiable margin and where their respective black levels are comparable, the image white peak level comes to be estimated from the white peak level of the text, and a level which splits the spectrum between this estimated white peak level and the actually measured black peak level at a ratio of 35:65 may, for example, come to be ascertained as the optimal threshold level for the image data.

FIG. 6 is a diagram which shows the image processing unit 28 of an image processing device 5 of another embodiment of the present invention. Its image decoding unit, however, is identical to that shown in FIG. 1 and is not reproduced in FIG. 6.

A digital image signal 16 which has been inputted from the A/D conversion unit 18 is temporarily retained in a line data retention unit 20. After the line data have been transferred to the density histogram generation unit 22, a density histogram is generated and then transferred to the threshold generation unit 24 and the image type classification unit 32.

The image type classification unit 32 determines the type of the inputted image based on the density histogram distribution and then transfers the obtained results to the threshold generation unit 24. The threshold generation unit 24 determines the threshold level based on the density histogram distribution and on the image type determined above, whereas the binarization unit 27 binarizes the image data retained in the line data retention unit 20 in pixel-specific fashion based on the threshold value 26 generated by the threshold generation unit 24.

A measurement data storage unit 34 is configured in the image processing device 5 shown in FIG. 6. Measurement data obtained during previous decoding operations are stored in the measurement data storage unit 34. More specifically, the measurement data, peak levels or peak frequencies calculated from the density histogram distribution, image types, threshold levels, etc. are stored. Functions of classifying image types or of generating threshold values are served with reference to the various sets of information stored in said measurement data storage unit 34 at a step where the image type is determined by the image type classification unit 32 or where the threshold value 26 is determined by the threshold value generation unit 24 during an image decoding operation.

FIG. 7 is a diagram provided for explaining a routine performed by using the apparatus shown in FIG. 6. In the figure, the solid line pertains to actual measurement data, whereas the dotted line pertains to storage data which are being stored in the measurement data storage unit.

The solid line in FIG. 7 shows the density histogram obtained based on the measurement results within the background region of the ordinary text original alone. In this case, a white peak which corresponds to the background exists in the measurement data, but no black peak level which corresponds to the ordinary text ink density exists. For this reason, necessary data for determining the threshold value have not been obtained. In such a case, it is also possible to determine the threshold level by assuming the black peak level to be "0" as an alternative to an undetectable black peak level.

As FIG. 3 graphically illustrates, however, the actually obtained black peak value is not "0", and therefore, a threshold level ascertained by assuming a black peak level of "0" is not a threshold level which is specific to the actual original state. Even when an attempt is made to beinarize the original by using this threshold value, therefore, it is possible for an immense disparity to be incurred between the actual original and the binarized original. Since only one peak is obtained, furthermore, it is impossible to classify the original type. Nor is it possible to select a method for determining a threshold level optimally suited for the original to be decoded.

As far as this embodiment is concerned, an attempt is made to refer to the white and black peak level information and original type information which have been obtained from the density histogram distributions of previous decoding operations and which are being stored in the measurement data storage unit 34. In FIG. 7, the dotted line pertains to the storage data which have been decoded from the measurement data storage unit 34. As the figure graphically illustrates, black peak values exist in the storage data which are being stored in the measurement data storage unit The black peak values within the decoded storage data can therefore be used n the context of determining the threshold level.

When the actually-measured white peak and the white peak of the storage data are compared, on the other hand, the respective peak values may not be very different. Furthermore, characters are included in the previously decoded data, whereas no characters are included int eh currently decoded data, and if these factors are taken into consideration, the peak level difference observed in FIG. 7 may be attributed to the effect of the black density region, as in the case of FIG. 3. It may be estimated, therefore, that the backgrounds of the currently decoded original and of the previously decoded original are identical.

As far as the example shown in FIG. 7 is concerned, therefore, the optimal threshold value is determined by using the currently measured white peak level and the black peak level of the storage data. Even when either peak cannot be found in the measurement data, therefore, the threshold level can be determined by assuming the black peak level to be "0", based on which the error potentials of the threshold level determination and binarizing routines can be alleviated.

The white peak level of the storage data on the previous operation and the white peak level of the current measurement data are specifically compared in the first place. When the level differential between the two is confined to a certain range, it is highly likely that the background colors of the currently and previously decoded originals will be the same. After it has ben assumed that the types of the currently and previously decoded originals are the same, the threshold level is determined based on an optimal threshold level calculation method specific to the original type classification results on the previous storage data by using the black peak level of the storage data and the white peak level of the measurement data. A level that splits the spectrum between the currently obtained white peak level and the previously obtained black peak level at 50:50 is ascertained as the threshold level in the example shown in FIG. 7.

Figure 8:
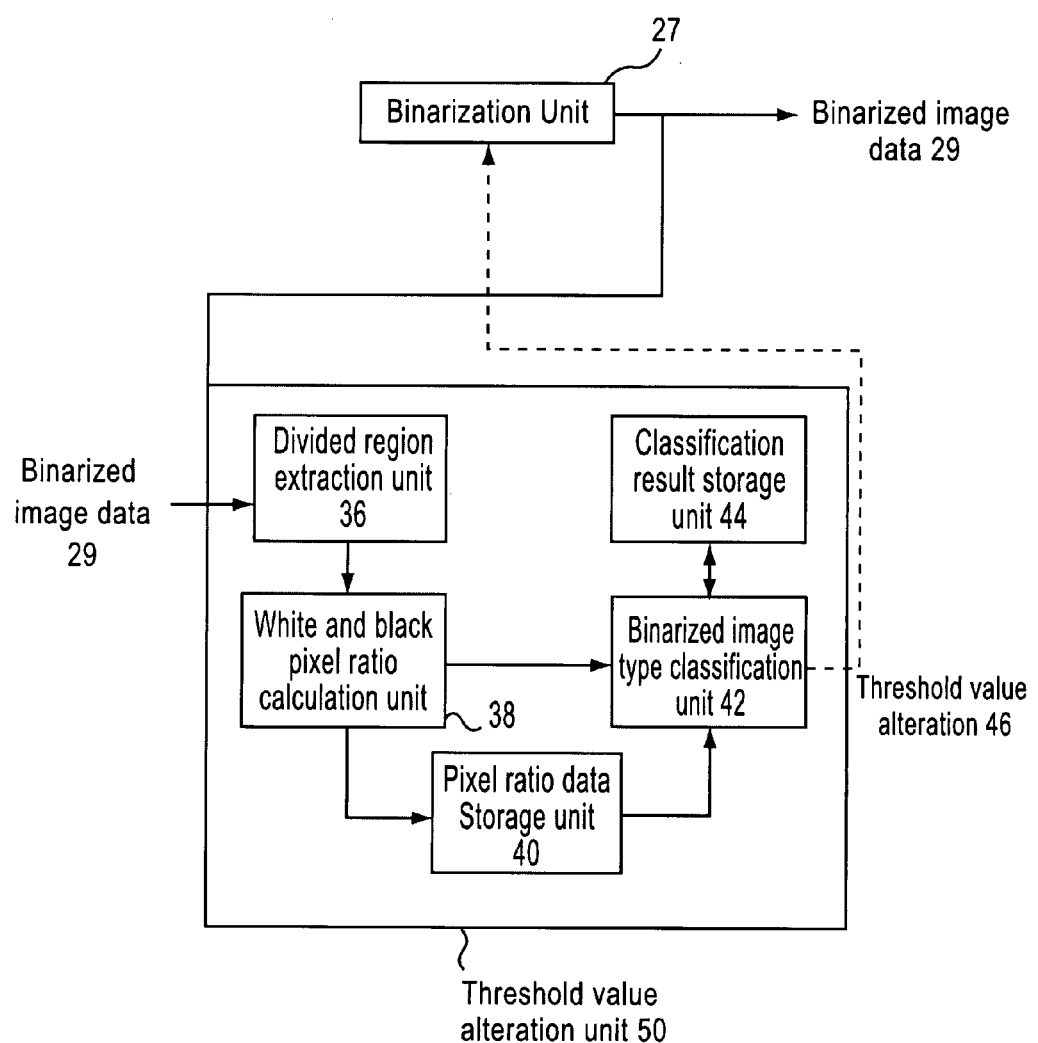
FIG. 8 is a block diagram which an image processing device of still another embodiment of the present invention.

FIG. 8 is a diagram which shows another embodiment of the image processing device 5 including a threshold value alteration unit 50.

The threshold value alteration unit 50 shown in FIG. 8 includes a divided region extraction unit 36 which divides received binarized image data 29 and extracts minor region units which are to become processing units in subsequent operations. The divided region extraction unit 36 is connected to the white and black pixel ration calculation unit 38. The white and black pixel ration calculation unit 38 calculates the white-to-black pixel ratio of each row of the decoded original. The divided region extraction unit 36 divides the original into the respective minor region units based on the calculated row-specific white-to-black pixel ratio.

The white and black pixel ratio data of temporally posterior and anterior regions during the decoding routine are stored in the white and black pixel ratio data storage unit 40. The binary image type classification unit 42, furthermore, classifies the image type of an isolated minor region of the original. The classification results obtained from the binary image type classification unit, furthermore, are stored in the classification result storage unit 44. The binary image type classification unit outputs a threshold value alteration 46 to the binarization unit 27.

Figure 9:
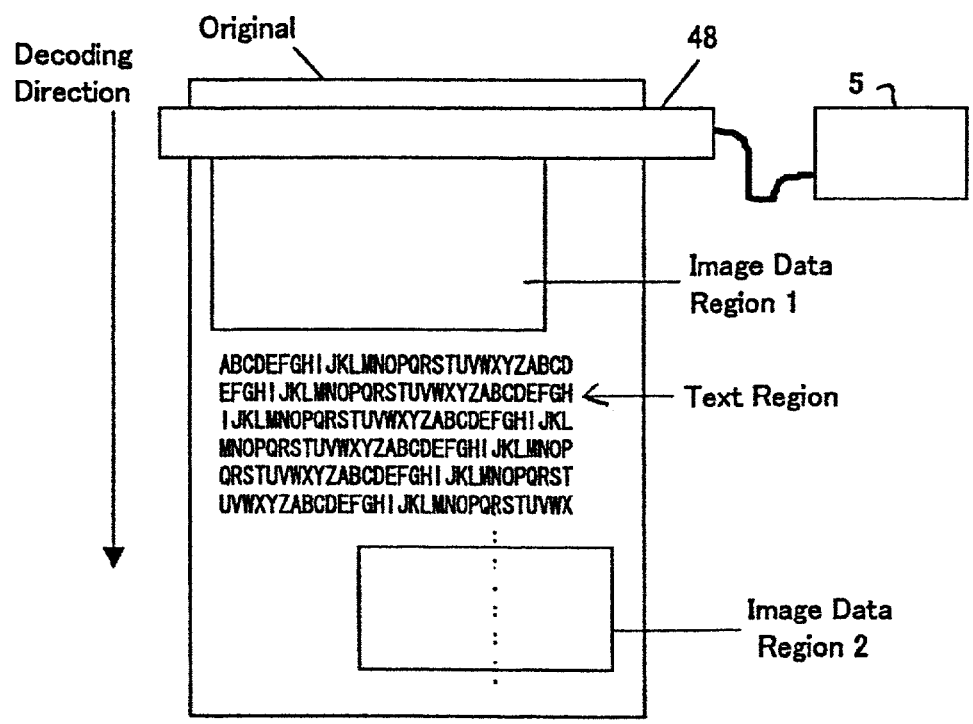
FIG. 9 is a diagram provided for explaining the procedures for decoding an original which can be divided into image data regions and text regions.

FIG. 9 is a diagram explaining an example in which the image type is classified from the binarized image data 29. A hand scanner 48 which is manually operated is hereby used as the image decoding unit 14 shown in FIG. 1. The decoded original, furthermore, is divided into three regions, namely, the image data region 1, text region, and the image data region 2.

Figure 10:
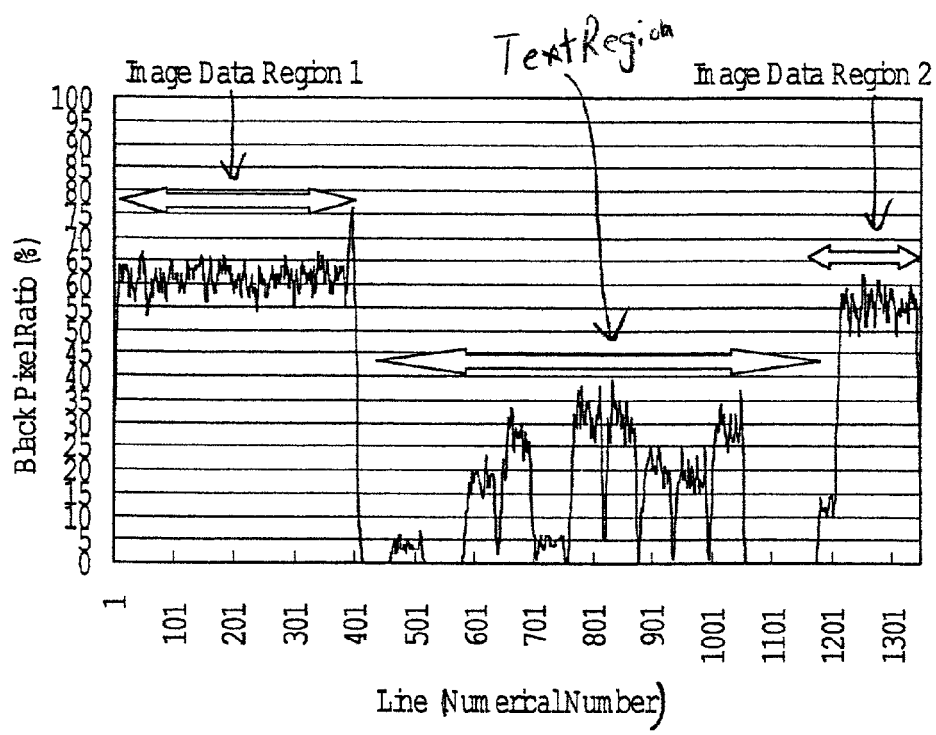
FIG. 10 is a diagram which shows the line-specific black pixel ratios of the image data obtained as a result of the decoding procedures shown in FIG. 9.

The minor regions are hereby divided and extracted by using one-line-equivalent data which are inputted over time in accordance with the scanning action of the hand scanner 48 in the direction of the arrow. FIG. 10 shows the line-specific black pixel ratio of a case where this original is binarized by using a threshold level suitable for an ordinary text.

As FIG. 10 indicates, the black pixel ratio per line is 40% or below within the ordinary text region, and the black pixel ratio varies drastically depending on the row alignment of the text. The black pixel ratio, on the other hand, is greater than 50% in each of the image data regions 1 and 2, and there are no significant black pixel ratio discrepancies among the respective lines.

It can thus be determined whether a given region above the original is a text region or an image data region based on the black pixel ratio and its variation pattern by conversely utilizing these characteristics of the black pixel ratio. A binarizing routine is further executed by generating a threshold level corresponding to a determined original type with regard to each region.

When binarization is carried out by using the threshold level suitable for image data, the black pixel ratios of the image data region 1 and image data region 2 become approximately 50%. The black pixel ratio, however, is greater than 50% in the example shown in FIG. 10 in that a threshold level suitable for the ordinary text has been selected. Conversely, a more accurate binarized image can be obtained by selecting a correspondingly appropriate threshold level when the image decoding unit 14 is located in the image data region and by selecting a threshold level appropriate for ordinary texts when the same is located in the text region based on the classification results shown in FIG. 10.

Figure 11:
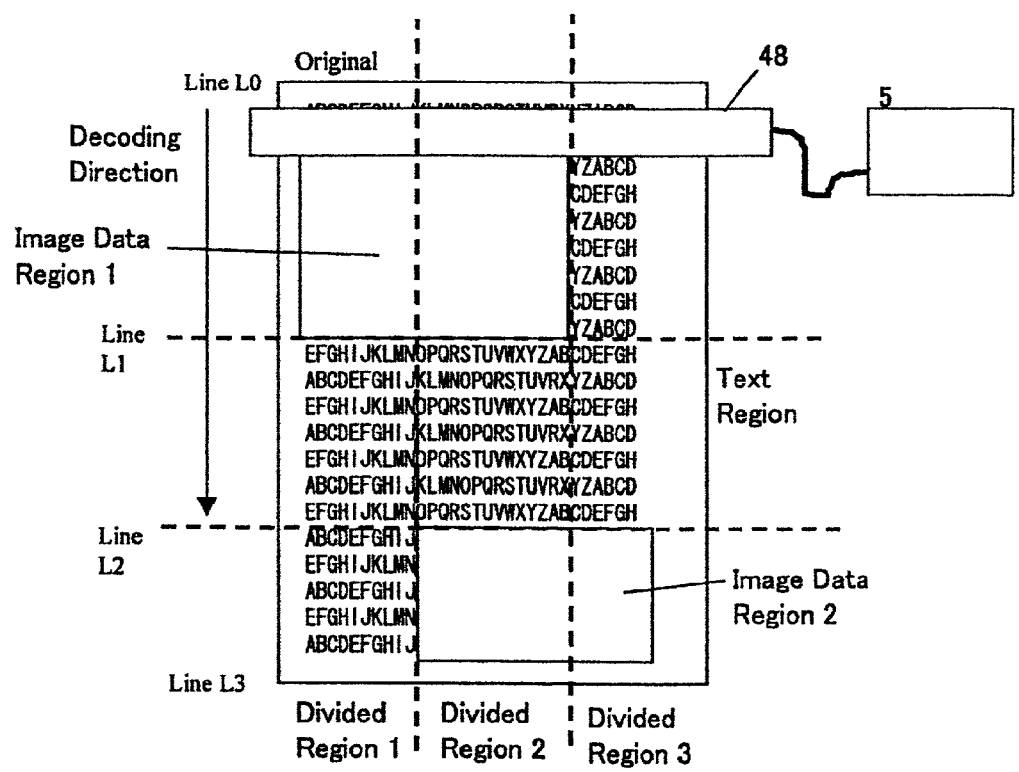
FIG. 11 is a diagram provided for explaining another example for decoding an original which can be divided into image data regions and text regions.

FIG. 11 is a diagram provided for explaining another method for classifying the image type from binarized image data 29, and two-dimensional configurations of minor regions can be hereby determined. In FIG. 11, divided regions are plotted not only along the auxiliary scanning direction but also along the main scanning direction (direction along the extension of the image decoding unit 14 shown in the figure), and the original type is classified by determining the black pixel ratios within the respective regions.

As has been mentioned above, the black pixel ratio of an ordinary text region is equal to less than 40%, and it varies considerably depending on the allocation of the text lines. The black pixel ratios of the image data region 1 and image data region 2, on the other hand, are consistently equal to greater than 50%, and no significant disparities are observed among the respective lines.

A text region and an image region, however, coexist on the original shown in FIG. 11, and when such an original is subjected to the routine explained above with reference to FIGS. 9 and 10, it may become impossible to execute an accurate binarizing routine.

In the embodiment of FIG. 11, therefore, a single line is divided into multiple regions, and line-specific black pixel ratios of the respective divided regions are classified, based on which two-dimensional image/text configurations can be determined. Two-dimensional image data configurations on the original, furthermore, are classified based on the classification results on the respective divided regions.

The action of the device of FIG. 8 is invoked in such a way that the white and black pixel ratio calculation unit 38 will compute the individual white and black pixel ratios of the respective divided regions mentioned above (divided regions 1 through 3 in FIG. 11).

Incidentally, the original is divided into three longitudinally in the example of FIG. 11. Exact division specifications may be adventitiously determined, and the number of divided regions may be enlarged for enabling a more accurate classification of an image/text configurational state. If the number of divided regions is excessively enlarged, however, cumbersome region-specific image type classification routines become required, and an extremely long processing time is incurred by a low-capacity device. An appropriate value should therefore be selected within a reasonable spectrum of region division numbers.

Figure 12:
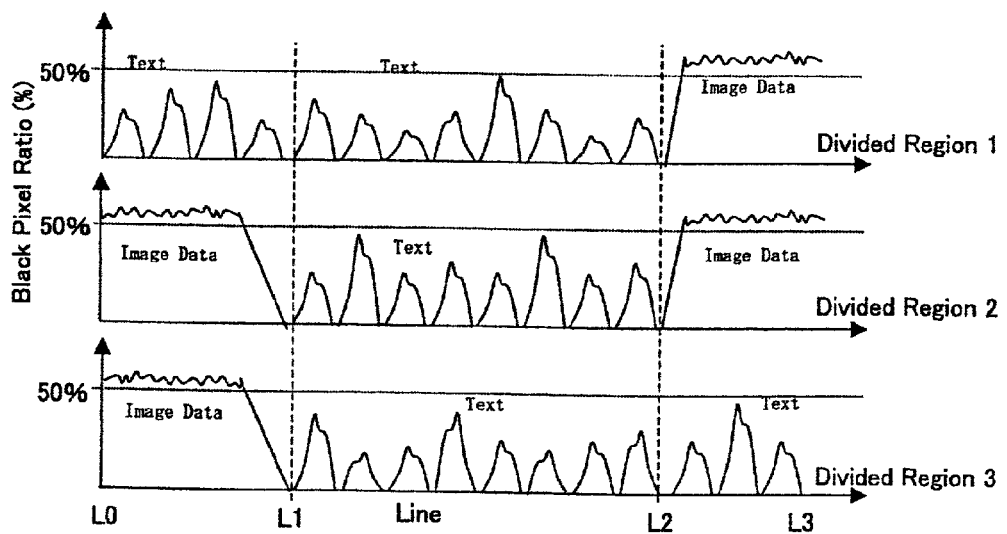
FIG. 12 is a graph which shows the line-specific black pixel ratio distribution among the respective divided regions.

FIG. 12 is a diagram which shows the line-specific black pixel ratio distribution among the respective three divided regions of the original shown in FIG. 11, As FIG. 12 graphically illustrates, black pixel ratios of greater than 50% are achieved in the respective regions between lines L0 and L1 of divided regions 1 and 2 as well as in the respective regions between lines L1 and L2 of divided regions 2 and 3, and since the value variation spectrum is minimal, these regions can be classified to be image data regions.

In the other regions, furthermore, the black pixel ratios were approximately 40% or below, and the line-by-line value variation spectrum was extremely broad. These regions can therefore be classified to be text regions.

As has been mentioned above, two-dimensional configurations of the respective image data on originals can be determined in the present application embodiment, and threshold value determination and binarization routines which reflect the types of originals more accurately can be executed.

As the foregoing explanations have demonstrated, in the present invention, the maximal density which corresponds to a background and the minimal density which corresponds to character/ink segments as well as their frequencies are calculated, and the type of an original which is being decoded can be classified based on such data. Since a threshold level corresponding specifically to the type of the original thus determined is generated, furthermore, binarization can be carried out by using the threshold value optimally suited for the original which is being decoded can be carried out, and accordingly, the binarizing accuracy can be upgraded.

The present invention, furthermore, enables the classification of the type of an original based on the white and black pixel ratios of a binarized image.

The type of an original which is being decoded, furthermore, can be determined in the midst of a binarizing routine even when multiple different types of image data exist on a singular original, and since optimal threshold levels can accordingly be designated adventitiously, accurate binarization is enabled.

The invention of claimed is:

1. An image processing device comprising:
    an image decoding means for decoding images recorded on a medium;
    a dividing image means for dividing said decoded image into multiple regions;
    a histogram generating means for generating a density histogram for each of said multiple regions that shows a density value distribution based on image data obtained from said image decoding means;
    a means for calculating for each of said multiple regions low-density-side and high-density-side peak levels and the low-density side and high-density side peak frequencies based on the generated density histogram;
    an image type classification means for determining the type of text and data formats printed on the original decoded image based on a magnitude relation between the low-density peak frequency and the high-density peak frequency;
    a threshold level generating means for generating for each of said multiple regions a threshold level based on the determined type of image; and
    a binarizing unit binarizing said image data based on the generated threshold level.

2. The image processing device recited in claim 1, wherein said image processing device further comprises:
    a storage means for storing at least one selected from among the high density side peak level, high-density side peak frequency, low-density side peak level and low-density side peak frequency which have been obtained as a result of previously generated density histograms,
    wherein, whenever there is either the absence of a low-density side peak level or high-density side peak level within the currently decoded image, the information on the low-density peaks or high-density peaks which is being stored in said storage means is decoded from the storage means wherein a threshold level is generated by using the decoded information.

* * * * *